United States Patent [19]
Lukas

[11] 3,970,783
[45] July 20, 1976

[54] LOADING COIL CASE AND CABLE CONNECTION FOR COMMUNICATIONS CABLES

[75] Inventor: Helmut H. Lukas, Carleton Place, Canada

[73] Assignee: Northern Electric Company Limited, Montreal, Canada

[22] Filed: Sept. 22, 1975

[21] Appl. No.: 615,548

[52] U.S. Cl. .............................. 178/46; 174/70 R; 336/65; 336/90
[51] Int. Cl.² ...................................... H01F 17/08
[58] Field of Search ............ 178/45, 46; 336/65 R, 336/90 R, 185; 174/70 R; 333/1

[56] References Cited
UNITED STATES PATENTS

| | | |
|---|---|---|
| 1,103,130 | 7/1914 | Horner et al. ................. 178/45 |
| 1,768,240 | 6/1930 | Falk ................................ 178/46 |
| 3,134,854 | 5/1964 | Martin, Jr. et al. ............. 178/46 |
| 3,838,213 | 9/1974 | Georgopulos et al. .......... 178/46 |
| 3,845,435 | 10/1974 | Georgopulos .................. 336/65 |
| 3,865,980 | 2/1975 | Moser et al. ................... 333/1 |

*Primary Examiner*—Saxfield Chatmon, Jr.
*Attorney, Agent, or Firm*—Sidney T. Jelly

[57] ABSTRACT

A cable end connection to a loading coil case has a lead sleeve crimped over the cable end, with a layer of sealing compound between the lead sleeve and the outer protective sheathing of the cable. The metal sheath of the cable is exposed at the cable end by removal of the protective sheathing for a short distance and the end of the lead sleeve is soldered to the metal sheathing. A tube extending from the end of the loading coil case is a close fit over the lead sheath, the outer end of the tube soldered to the lead sheath.

3 Claims, 13 Drawing Figures

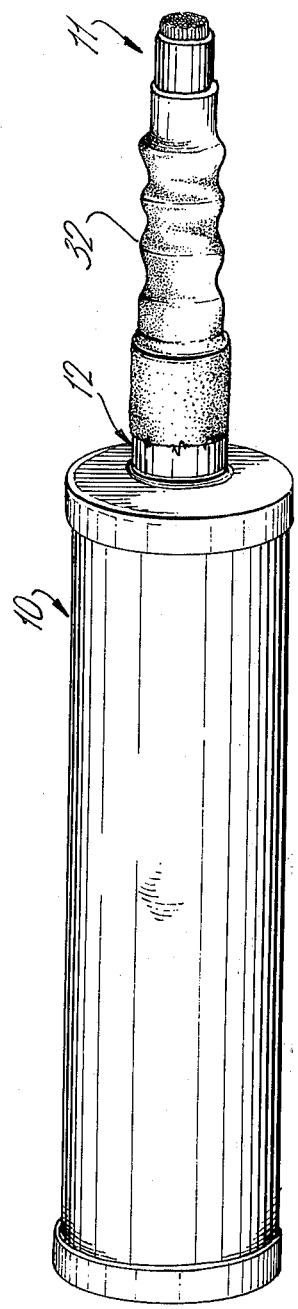
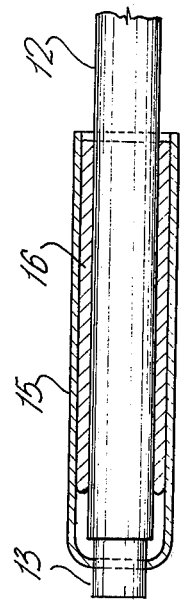
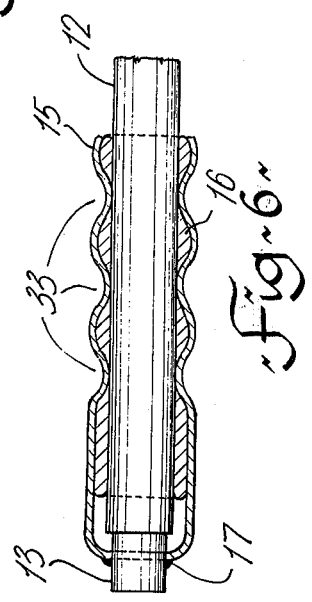

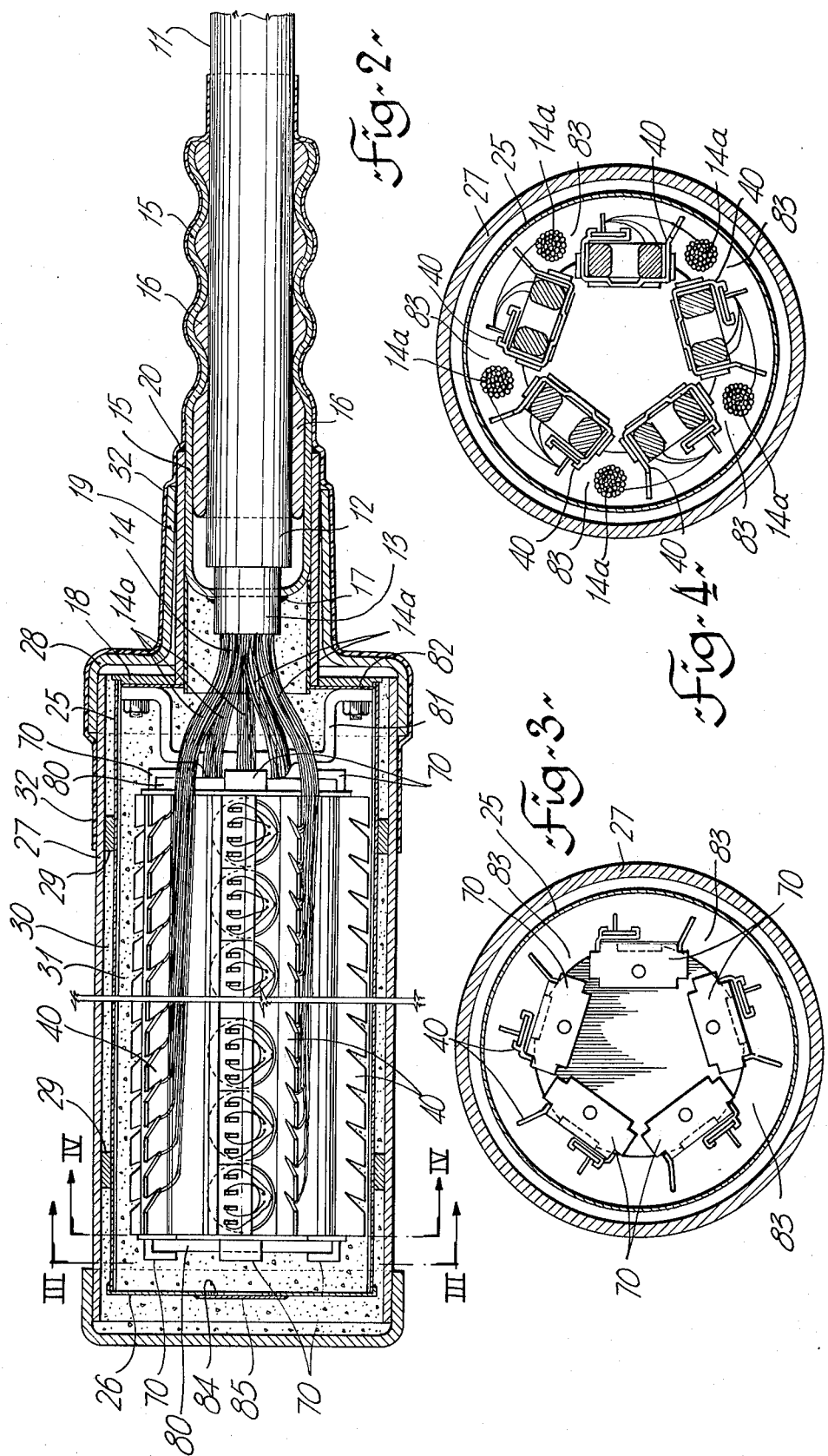

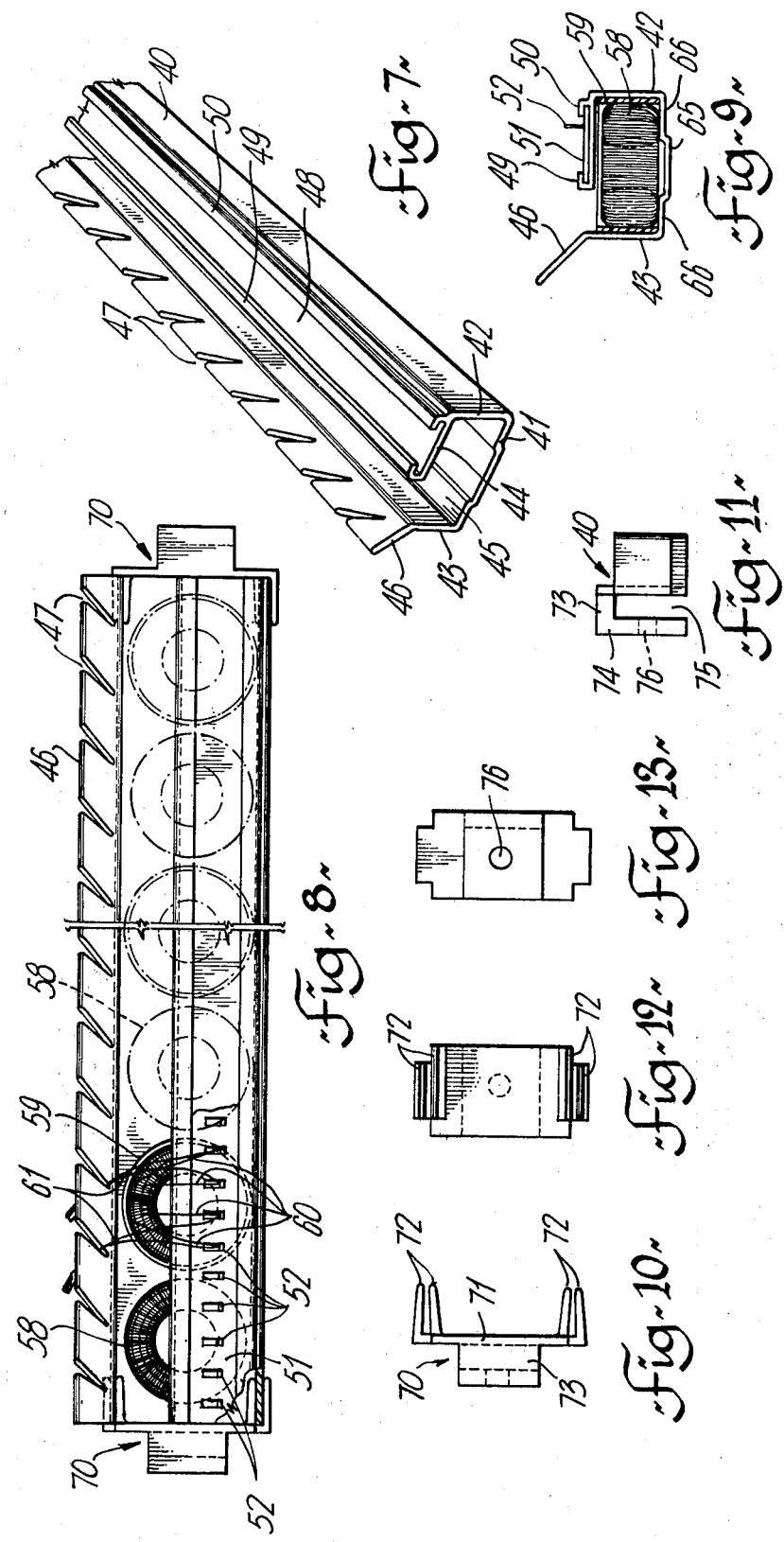

LOADING COIL CASE AND CABLE CONNECTION FOR COMMUNICATIONS CABLES

This invention relates to loading coil cases and connection to cables of such cases for communication cables, particularly telephone and similar forms of cable.

Loading coils are connected into cables at predetermined positions to maintain the operating characteristics of the cable. The coils are assembled into a casing which may by mounted on a cable, on a pole, underground or in a manhole. The coils are connected, or spliced, into a cable by means of a stub cable.

A case must provide protection against the environment, prevent damage to the coils and provide a satisfactory connection with the stub cable. The sizes of a stub cable can vary and hitherto this has called for a considerable variation in case sizes. Also out-of-roundness, or lack of concentricity of the cable core, metal sheath and outer sheath of the cable normally creates difficulties in obtaining a satisfactory attachment and sealing of case to stub cable.

The present invention provides a case which gives good protection, has good mechanical connection between case and cable, has improved electrical continuity between the cable sheath and case and has a very high standard of pressure sealing. Variations in cable size and lack of concentricity and other variations in cable physical characteristics can be accepted.

The invention will be readily understood by the following description of certain embodiments, by way of example, in conjunction with the accompanying drawings, in which:

FIG. 1 is a perspective view of a case and cable stub, with part of the outer sheath removed from the case;

FIG. 2 is a longitudinal cross-section through the case and cable stub of FIG. 1;

FIGS. 3 and 4 are cross-sections on lines III—III and IV—IV respectively of FIG. 2;

FIGS. 5 and 6 illustrate steps in attaching a lead sleeve to the cable stub preparatory to attaching to a case.

FIG. 7 is a perspective view of an extrusion, or molding, for a magazine;

FIG. 8 is a plan view of a magazine with coils in position;

FIG. 9 is an end view of the magazine of FIG. 8 with the end cap removed;

FIGS. 10, 11, 12 and 13 are respectively plan, side, end and front views of an end cap for the magazine of FIGS. 7, 8 and 9.

As illustrated in FIG. 1, a case 10 has a cable 11 entering at one end, for convenience referred to as the lower end. The case has an inlet tube assembly 12 at the lower end, seen in more detail in FIG. 2. It is essential that the mechanical and electrical connection between cable and case be of very high quality. If the mechanical connection is not strong, cracking can occur due to relative movement between case and cable.

As seen in more detail in FIG. 2, cable 11 has the outer protective sheath 12 removed at one end to expose a short length of the metal sheath 13. The metal sheath 13 in turn has been removed to expose lengths of the conductors 14 of the cable for fanning out and passage up through the case for connection to loading coils.

A lead sleeve 15 is crimped on to the outer sheath 12 over a layer of sealing tape 16. The inner end of the lead sleeve 15 is soldered to the metal sheath 13 of the cable, at 17. The outer end of the lead sleeve is sealed to the end of the outer coating or sheathing 12 of the cable by sealing tape compound, and an overlay of heat shrinkable plastic sheathing.

Over the lead sheath is passed a case end comprising an end disc or plate 18 and a tube 19. Disc or plate 18 and tube 19 can be formed in one piece or of two pieces connected together, as by welding. The tube 19 is a close fit over the crimped lead sleeve 15 and is soldered at its outer end to the lead sleeve, at 20.

The disc 18 is positioned in the end of an inner then shell 25 which is soldered to the disc. The opposite end of the inner shell is closed by a disc 26, and the whole inner shell enclosed in an outer shell 27 with end cap 28. Spacers 29 are provided to position outer shell 27 relative to the inner shell 25. The space 30 between shells 25 and 27 is filled with polyurethane type compound, as is also the space 31 within the inner shell 25, around the coils and support structure. The whole assembly is then covered by the outer heat shrinkable plastic sheathing, for example black high density polyethylene, at 32 FIGS. 1 and 2, but broken off short in FIG. 1 for clarity.

FIGS. 5 and 6 illustrate two stages in preparing the end of the stub cable for attachment of the loading coil case. As seen in FIG. 5 the outer sheathing 12 has been removed to expose the metal sheath 13. A layer 16 of sealing tape, for example of an elastomeric material, is placed on the metal sheath 13. This layer 16 is made up of one or more wrappings of sealing tape. A lead sleeve 15 is then positioned over layer 16. The cable end is then as in FIG. 5.

The lead sleeve 15 is crimped to the cable end by circumferentially extending crimps 33. The sealing compound is compressed withing the crimps, providing a pressure seal and mechanical stability between the cable and lead sleeve. The end of the lead sleeve is then soldered at 20 to the metal sheath 13. Sealing compound expands out of the other end of the lead sleeve 15 to provide a seal. The base end comprising disc 18 and tube 19, FIG. 2, is then attached to the lead sleeve.

A heat shrinkable plastic tube is shrunk over the lead sleeve and adjoining cable and outer shell of the case to form the sheathing 32. This provides an additional seal, corrosion protection at the position where the lead sleeve meets the metal tube 19, as well as providing an aesthetic finish.

By varying the thickness of the layer of sealing tape 16 and by varying the depth of the crimps 33 one size of tube 19 can accommodate varying sizes of cable.

The assembly provides a strong mechanical joint or attachment. The length of the tube 19 and its engagement with the lead sleeve provide a high strength connection from cable to case, while the layer 16 provides flexibility which avoids cracking. The end cap 28, with its tubular extension 28 engaging over the tube 19 also adds mechanical strength. A similar assembly can be used for other shapes of casing, for example square or rectangular cross-section cases. In such cases the end plate will not normally be a disc but some other shape.

A particular form of magazine, suitable for preassemble of coils to the magazine, is illustrated in FIGS. 8 to 13.

As seen in FIG. 7, a main body 40 of a magazine is in the form of an extrusion having a modified channel-shaped cross-section. Thus there is a base web 41, two parallel side webs 42 and 43 and an inwardly extending top web 44 extending from the top edge of side web 42 towards side web 43. Top web 44 extends only part way across the body 40 to leave an access slot 45. At the top edge of the side web 43 extends an outwardly inclined web 46. Inclined slots 47 are formed in web 46 which acts as a fanning strip for the cable pairs.

The top surface of top web 44 is shaped to provide a shallow channel 48 with inturned edges 49 and 50. Terminal strips 51 (FIG. 8) slide into the shallow channel 48 from the end of the body 40. Conveniently each terminal strip has four terminals 52 and serves for one coil. If desired longer terminal strips could be used with more than four terminals. Also the terminals could be mounted by some other arrangement, for example ultrasonically inserted directly to the top surface of the web.

The arrangement of coils and terminal strips is seen in FIGS. 8 and 9, coils 58 being shown in the main body 40, together with associated terminal strips 51. Each alternate coil is surrounded by a plastic sleeve 59. Attaching of the wires 60 from the coils 58 to the terminals 52 to a large extent prepositions the coils so that the beginning and ends of the windings, which are at the positions at which the wires 60 extend from the coil, are not adjacent to each other in adjacent coils. Generally the coils are positioned as illustrated in FIG. 8. The conductors from the cable are indicated at 61.

The coils are a fairly close fit in the main body 40 and are slid in from one end. To reduce friction between coils and the base web 41 this is shaped to have a recessed centre portion 65 and raised side portions 66, although this is not essential. This is seen quite clearly in FIG. 9. The recessed portion also allows for a rear entrance slot to the coils when potting the coils with a polyurethane type filler compound.

The coils can be fed in from both ends of the body 40 or only from one end, as desired. If the magazine is of flexible material, the coils can also be inserted via the longitudinal opening. End caps 70 are fitted on each end of the body to retain the coils in position and to provide attachment means for the magazine. In FIG. 8 an end cap 70 is shown on each end.

FIGS. 10, 11, 12 and 13 illustrate an end cap in more detail. Basically an end cap 70 comprises a channel shaped member having a base web 71 and a pair of closely spaced webs or legs 72 on each side. The webs or legs 72 of a pair are spaced apart so as to be a push fit on one of the side webs 42 and 43 of the body 40. The pairs of webs or legs are spaced so that each pair cooperate with a related side web 42 or 43. Extending from one edge of the base web 71 - referred to as the top edge for convenience, is a short web 73. Web 73 extends in the opposite direction to the webs or legs 72 and at its end is a further web 74 extending parallel to and spaced a short distance from the base web 71. There is thus provided a slot 75 which provides a means for attaching magazines to a support structure, as will be described. A hole 76 is formed in the web 74 for cooperation with a protrusion on the support structure.

After assembly of the coils into a magazine, attaching of end caps and soldering, or otherwise connecting wires 60 to the terminals 52, there is provided a compact assembly for attachment to a support structure of a casing. The connection of the wires 60 to the terminals is done at the magazine assembly stage. With the coils positioned side-by-side, with their axis perpendicular to the assembly plane, there is only line contact between adjacent coils, and even here there is slight separation by the plastic sleeve 59. Thus cross-talk is reduced to a minimum. Also, as described above, the connecting of wires 60 to the terminals 52 on the terminal strips 59, with the offset positioning of the terminal strips relative to the coil axes, tends to ensure that the coil winding starts and ends of adjacent coils are spaced apart from each other.

The number of coils per magazine can be varied, as stated, by variation of the length of the body 40. A varying number of magazines can be mounted in a casing and it is possible to provide for a considerable variation in number of coils by varying the length of a magazine and the number of magazines in a casing. It has been found convenient, for example to provide four different lengths of magazines and three different casing sizes, that is three different numbers of magazines.

It has been found convenient also to provide for two different coil sizes, one for suburban use and a larger coil for rural areas where conditions of service can be more severe. For the larger coils, magazines having a larger cross-section are used. The same alternative magazine lengths are provided - holding fewer coils, and the number of magazines per casing are reduced to use the same casing sizes as for the smaller coils.

FIGS. 2, 3 and 4 illustrate the assembly of a plurality of magazines, as described above, into a casing composed of the inner shell 25, and outer shell 27. The magazines 40 are supported at each end on a support member in the form of a disc 80. The magazines are arranged in the present example, in a single circle, and are mounted on the discs by means of the end caps 70 which clip over the edge of the disc, the disc 80 fitting into the slots 75 of the end caps. Conveniently the web 74 of each end cap 40 has a hole 76 and a projection on the surface of the disc enters the hole. Thus the end caps 40 are both positioned and held on the discs 80.

At the lower end of the case, the disc 80 is secured to a support bracket 81 which in turn is bolted to the metal end disc 18. An insulating disc 82 is positioned between bracket 81 and end disc 18.

The cable 11 entering via the inlet tube 19, with the lead sleeve 15 crimped on to the end of the cable sheathing 12, as described, the conductors 14 of the cable are split into a number of separate bundles 14a, a bundle extending up in each channel 83 formed between two adjacent magazines 40.

After loading of the magazines on to the support members and insertion into the inner casing 25 the inner casing is soldered to the end disc 16 and the whole is filled with the expanding plastic material through an aperture 84 in end disc 26, after which the aperture 84 is closed by a disc 85. The assembly is then placed in the outer plastic casing 27 bonded or welded at the lower end to end cap 28. The space between the inner casing 25 and outer casing 27 is filled by the expanded plastic material through the open upper end and afterwards closed by cap 34. The outer bottom portion of the casing to the cable entrance position is then enclosed in the tube of heat shrink plastic 32.

What is claimed is:

1. A loading coil case and cable end connection assembly, comprising:
    a loading coil case including an inlet tube assembly at an inlet end, said inlet tube assembly including an end plate and a tube extending from said end plate;

a cable end entered into said tube, the cable end including a metal sheathing around conductors of the cable and a protective sheating around said metal sheathing;

said metal sheathing removed at said cable end for a length to expose the conductors, the conductors entering the casing and connected to loading coils in said case;

said protective sheathing removed to expose a short length of the end of said metal sheathing, the ends of said metal sheathing and said protective sheathing positioned within said tube;

a layer of sealing compound over said protective sheathing;

a lead sleeve over said layer of sealing compound and extending part way over said exposed length of said metal sheathing, and crimped onto said cable end, an end of said metal sheathing soldered to said exposed length of metal sheathing.

2. An assembly as claimed in claim 1, including an inner case attached to said end plate; an outer case extending around and spaced from said inner case; an end cap on an inner end of said outer casing, said end cap including a tubular extension extending over said tube extending from said end plate.

3. An assembly as claimed in claim 2, including a heat shrinkable plastic sheathing extending over said lead sleeve, said end cap and said tubular extension of said end cap, and over at least the inner end part of said outer case.

* * * * *